May 23, 1961        J. F. HASENKAMP        2,985,827
MOISTURE SENSING MEANS
Filed Aug. 5, 1957                          2 Sheets-Sheet 1
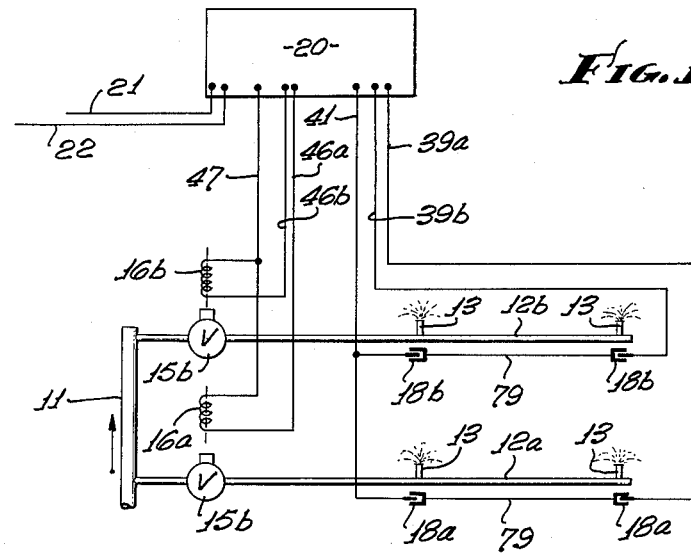
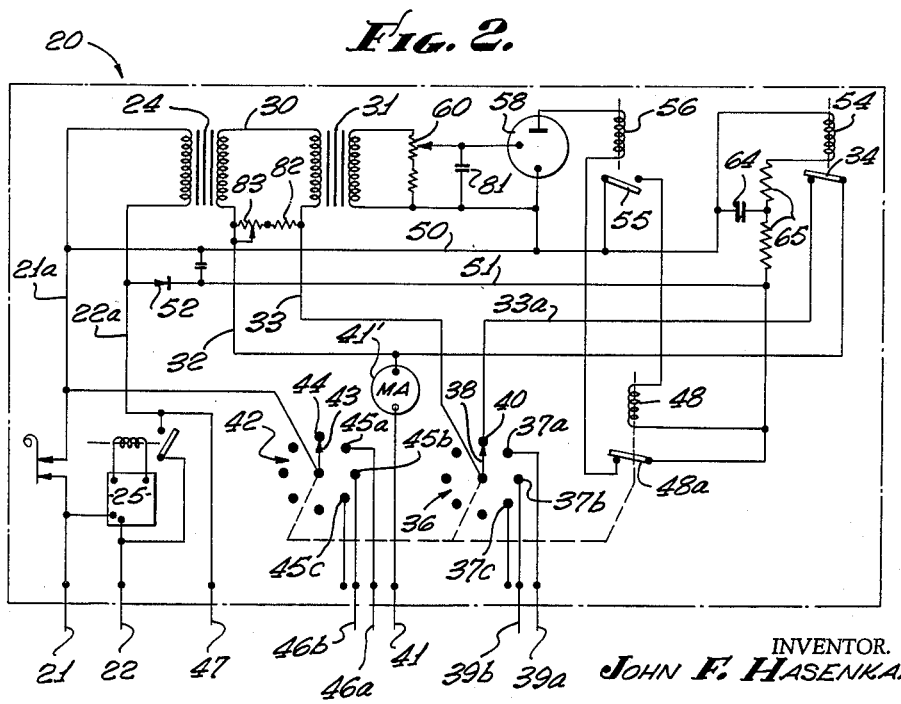
INVENTOR.
JOHN F. HASENKAMP
BY
Mason & Graham
ATTORNEYS.

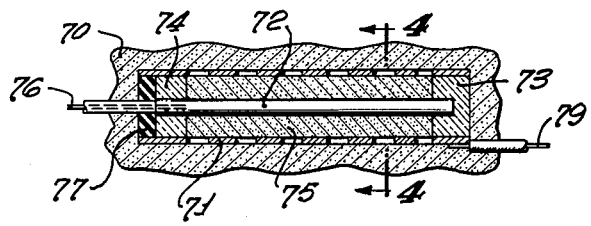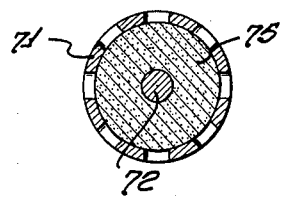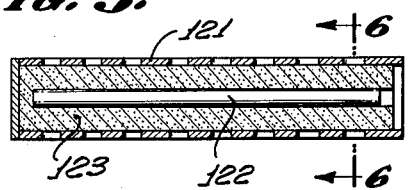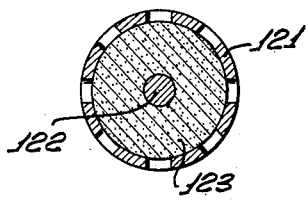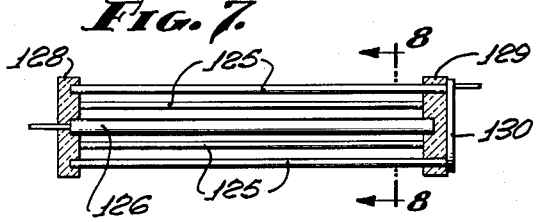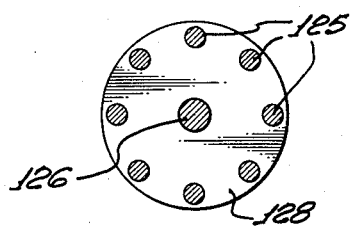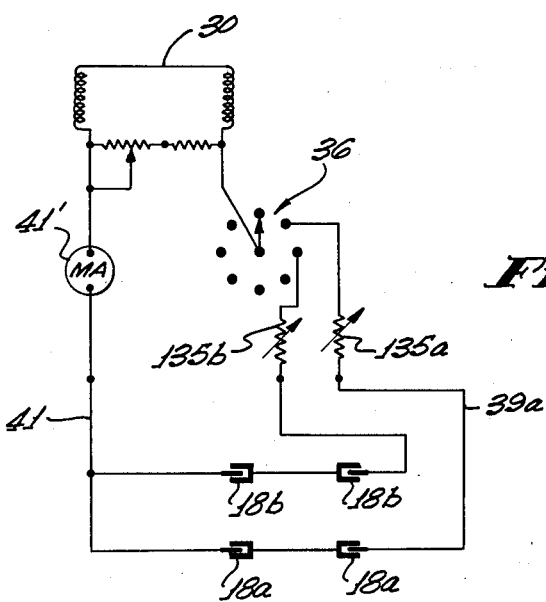

United States Patent Office 2,985,827
Patented May 23, 1961

2,985,827
MOISTURE SENSING MEANS
John F. Hasenkamp, 1535 Rugby Place,
Chattanooga, Tenn.
Filed Aug. 5, 1957, Ser. No. 676,127
1 Claim. (Cl. 324—65)

This invention has to be generally with means for sensing or detecting the presence of moisture in a porous substance such as soil, and the utilization of such means for controlling the application of moisture to the substance when moisture is required. The invention is particularly useful in connection with and as a part of an electrical control apparatus of the type set forth in my United States Letters Patent 2,695,976, for automatically controlling an irrigation or moisture supply system.

This application is a continuation in part of my co-pending application for patent entitled "Automatic Irrigation Control Means," Serial No. 468,365, filed November 12, 1954, now Patent No. 2,812,976.

An object of the invention is to provide a novel, effective means for determining the presence of moisture in the ground, or in some other porous substance which is normally or of itself non-electrically conductive, and of providing moisture sensitive means responsive to the presence of moisture suitable for use in conjunction with electrical means for controlling the application of moisture to the ground or such other substance.

Another object of the invention is to provide moisture detecting or sensing elements of novel construction, adapted to be buried in the ground or in some other porous substance in which they are to function. A further object in this connection is to provide a novel means of connecting such device in an electrical circuit in a manner to give a more accurate indication of moisture conditions in a given area than has heretofore been possible with prior devices which which I am familiar.

A further object is to provide a simple, easily manufactured sensing or detecting unit of the general type indicated.

These and other objects will be apparent from the drawings and the following description.

Referring to the drawings:

Fig. 1 is a diagrammatic view of an irrigation system and control means therefor, embodying my invention;

Fig. 2 is a schematic wiring diagram of the electrical control circuits;

Fig. 3 is a longitudinal sectional view of a detector or sensing unit shown buried in the ground;

Fig. 4 is a sectional view on line 4—4 of Fig. 3;

Fig. 5 is a longitudinal sectional view of another form of detector unit;

Fig. 6 is a sectional view on line 6—6 of Fig. 5, but on a larger scale;

Fig. 7 is a longitudinal sectional view of still another form of detector unit;

Fig. 8 is a sectional view on line 8—8 of Fig. 7, but on a larger scale; and

Fig. 9 is a schematic wiring diagram of a modified moisture detection or sensing circuit.

More particularly describing the invention, in Figs. 1-3 I show a simple irrigation system embodying the invention. Referring to these figures, numeral 11 indicates a water supply pipe which it may be assumed is connected to a source of water under pressure. Two branch irrigation pipes 12a and 12b are shown leading from pipe 11, the branch pipes being provided with suitable outlets as sprinkler heads 13. In an actual installation, the pipes would usually be laid under the surface of the soil and the outlets or sprinkler heads disposed at desired elevations above the surface.

Supply of water to the branch pipes is controlled by valves 15a and 15b which are normally closed. The valves are opened by solenoids 16a and 16b.

In each section of ground covered by each branch irrigation pipe I provide moisture detector or sensing means and in Fig. 1 I show detector or sensing units 18a associated with branch pipe 12a and detector or sensing units 18b associated with branch pipe 12b. These units may be buried in the ground at a desired depth which will vary depending upon the nature of the soil and the vegetation being irrigated. The units in each section are connected electrically to a control unit 20.

The control unit, when energized, is adapted to supply current successively to the detector units in each area of soil to be irrigated and successively to power circuits for operating the solenoids which actuate the valves. In a typical operation, current is first supplied to a detector or sensing circuit including detector units 18a and to a power circuit including solenoid 16a. If the soil in which units 18a are buried is not sufficiently moist, continued flow of current through solenoid 16a opens valve 15a thereby supplying water to branch pipe 12a. When the area has had enough water, or if it was originally sufficiently moist, the detector units pass sufficient current to cause the control unit to deenergize the detector and power circuits including, respectively, units 18a and solenoid 16a and to energize circuits including units 18b and solenoid 16b. The cycle is then repeated for the section covered by pipe 12b and as many additional sections as may be embodied in the system.

Referring particularly to Fig. 2 for a description of the control unit 20, this is adapted to be connected to a suitable source of alternating current, such as a conventional 115-volt supply, by means of leads 21 and 22. Wires 21a and 22a form continuations of the leads and are connected to form what will be called the A.C. supply circuit through the primary coil of a transformer 24. Preferably I provide a time or clock switch 25 in the circuit so that the system may be fully automatic and be set to operate at any desired time. I may also provide a thermostatically controlled switch 27 in this circuit as a safety feature.

The control unit includes what will be termed a moisture detector or sensing circuit, generally indicated by 30. This includes the secondary winding of transformer 24 and the primary winding of a transformer 31. I prefer to employ a somewhat lower voltage in this circuit than in the supply circuit and this may conveniently be 24 volts. In the original or normal position of the device this circuit is closed through conductors 32, 33 and 33a and a normally closed relay switch 34. However, as will later be explained, after initial energization of the control unit, switch 34 opens and remains open until time switch 25 opens the A.C. supply circuit. Included in circuit 30 is a detector unit selector switch 36 having contacts 37a, 37b, 37c, etc., the first two of which are shown connected to the detector units 18a and 18b, respectively, by conductors 39a and 39b. The movable contact arm 38 of the switch is connected to conductor 33 and, when in its original position, rests on a contact button 40 which is connected to switch 34 by conductor 33a, thereby completing the detector circuit as aforementioned. A common lead 41 runs from conductor 32 to the detector units. I may include a suitable instrument, such as a milliammeter 41' in the detector or sensing circuit for the purpose of giving a sensible indication of the amount of current flowing in the circuit. If desired the instrument may be calibrated to give a direct reading of the amount or percentage of moisture in the soil or other media in which the sensing units are embedded.

A power circuit selector switch 42 is provided for successively supplying current to the solenoids for operating the valves. This switch has a movable contact arm connected to conductor 21a. This arm originally makes contact with a dead contact point 44. Other contact points 45a, 45b, 45c, etc., are provided, one for each valve-operating solenoid. The first two of these are shown connected to the solenoids 16a and 16b by conductors 46a and 46b. A common lead 47 runs from conductor 22a to the several solenoids.

The two selector switches are ganged together in any manner to be advanced one contact for each energization of a step relay 48 which is connected across conductors 50 and 51 supplying direct current to a relay 54. A rectifier is indicated at 52. Included in the circuit with the step relay is a normally open switch 55 forming part of a relay 56, the coil of which is in series in the plate circuit of a cold cathode tube 58. The grid of the tube is connected to transformer 31 through the medium of a potentiometer 60. The cathode is connected to the same transformer and to negative supply conductor 50.

A step relay breaker switch 48a is connected in series in the plate circuit of the tube and this switch opens upon energization of step relay 48 after a time delay sufficient for the relay to advance the selector switches. A conventional step or stepping relay may be used and connected electrically as shown and described herein.

After initial energization of the control unit, as by closing of time switch 25, switch 34 opens and thereafter the amount of current flowing through the moisture detection or sensing circuit 30 is governed by the impedance offered by the detector unit or units in the circuit at any given time through which the current must flow to complete the circuit. In order to hold switch 34 closed long enough after initial energization of the control unit to accomplish the first actuation of the step relay 48, a condenser 64 is connected across the relay intermediate resistors 65. Thus, when the control unit circuits are initially energized the detector circuit is closed through switch 34 and starter voltage is furnished the tube whereby to cause current flow in the plate circuit of the tube. This latter closes switch 55 of relay 56 thereby energizing step relay 48 which actuates the selector switches for the first operation thereof. Relay 48 subsequently opens breaker switch 48a in the plate circuit with the result that switch 55 opens and relay 48 becomes deenergized.

In Figs. 3 and 4 I show one form of moisture detector unit adapted to be buried in the soil 70. The unit comprises an outer electrode 71 in the form of an apertured metal casing. Within this is mounted an inner metal electrode 72. Porcelain or other insulation bushings 73 and 74 serve to mount the two electrodes in spaced relation leaving a space 75 therebetween which is filled with soil. The bushing 73 encloses the end of the inner electrode at one end. The other end projects through bushing 74, receiving an insulated conductor 76. A plug 77 of an insulative and sealing material covers this end of the inner electrode. An insulation covered conductor 79 is attached to the outer electrode. It will be apparent that the electrodes may be formed of various materials. However, I prefer to utilize non-corrodible metals for this purpose.

As previously indicated, I prefer to employ two moisture detector or sensing units for each area to be irrigated by a branch irrigation pipe. However, it is only necessary to employ one such unit and more than two may be used if desired, as where a large area is to be controlled. By using two units and placing them at different depths in the soil it is possible to accurately control depth of irrigation under a variety of conditions. It often happens that the upper surface layer of soil becomes dried out while there is still sufficient moisture at lower levels. At other times, as after a light rain, the surface soil may be quite wet and yet at a depth the ground may be too dry. With two such detector units connected in series and buried at different depths these conditions may be detected and irrigation supplied as required.

In connecting the detector units I prefer to connect the outer electrodes of the devices together, as by a length of bare or insulated wire 79 (Fig. 1). The inner electrodes are connected one to the common line 41 and the other to one of the contact points of the detector selector switch 36. Thus the inner electrodes are at the voltage potential of the detector circuit and the outer electrodes, being connected together, are both at the same potential. The construction of the detectors and the manner of connecting them thus prevents currents taking an undesired path through or over the soil and makes possible an accurate determination of the moisture of the soil in the given areas. Furthermore, since alternating current is employed, electrolysis, electrolytic polarization, endosmosis and cataphoresis are reduced to a minimum.

The operation of the system is as follows: The time clock switch is set to operate at any desired hour, at which time the A.C. supply circuit is closed and remains closed for a given period of time, assuming that the thermostat switch 27 is closed. Current then flows through transformer 24 energizing the detector circuit. The current also branches for flow through rectifier 52 for plate circuit operation of the cold cathode tube and relay 56. The relay 54, which is closed prior to energization, opens after a slight delay as previously explained, the delay permitting starter anode current to flow with the result that current flows through the tube energizing relay 56 and closing the switch portion 55 thereof. With the closing of the switch, the circuit through the step relay 48 is closed and energization of this relay advances the two detector switches to the next switch contact point.

The step relay, after advancing the selector switches, opens the breaker switch 48a which is in series in the plate circuit of the tube. When the plate circuit is opened, relay 56 is deenergized and the step relay is deenergized.

On the first actuation of the step switches, the movable contact arm 38 of switch 36 makes contact with button 37a thereby bringing the moisture detector units 18a into series in the detector circuit 30. At the same time, contact arm 43 of step switch 42 makes contact with the button 45a establishing a circuit through solenoid 16a which opens valve 15a to branch irrigation pipe 12a. When the area covered by pipe 12a has received sufficient water, the soil, including that within the sensing units or detectors, becomes moist enough to lower the impedance of the detector units sufficiently that the resultant flow of current in the detector circuit will induce a starting voltage for the tube, current will flow in the plate circuit of the tube closing relay 56 which in turn again energizes the step relay with the result that the selector switches are advanced. Of course, if the soil was originally wet, there would be an immediate flow of sufficient current in the detector circuit with the result that the step relay will immediately kick the selector switches over to the next contact.

It will be apparent that by adjusting the setting of potentiometer 60, the system may be set to be responsive to any desired degree of moisture in the soil. I may add a condenser 81 in the grid-cathode circuit to take care of variations or surges in the supply circuit and increase the accuracy. I may also employ a fixed resistor 82 and a variable resistor 83, connected in series across the detector circuit, to introduce a further adjustment in the system.

When the step switches have moved around to their original positions, the system ceases operating until it is disconnected from the source of current and again connected, as by the normal operation of the time control switch. The reason for this is that the detector circuit is open since switch 34 remains open after the initial delay in opening of the same at the start of the operation. Hence transformer 31 is dead and no starter anode current is supplied to the tube. It may also be noted that the movable arm of the power circuit selector switch now rests on the dead contact button so that no current is supplied to any of the valve-operation solenoids.

In Figs. 5 and 6 I show another form of moisture detector or sensing unit which may be used in place of that shown in Figs. 3 and 4. The detector comprises a perforate tube 121 of an electrically conductive metal, as the outer electrode, and an inner metal bar 122 as the inner electrode. A porous ceramic body 123 separates the electrodes and serves as a means of mounting the inner electrodes within the outer.

In Figs. 7 and 8 I show still another form of moisture detector in which the outer electrode comprises a plurality of electrically conductive bars 125 spaced circumferentially of each other and radially from a parallel center bar 126 of metal which comprises the inner electrode. The various bars are mounted in apertured disks 128 and 129 of electrically non-conductive material. A metal disk 130 at one end electrically connects the outer bars. In use, the detector is buried in the substance to be tested with the substance packed between the bars.

While I have illustrated the use of two detector or sensing units connected in series for each area to be irrigated, there may be instances where one such unit would be sufficient. However, there are advantages in using the two sensing elements. One advantage is that by placing the sensing elements at laterally spaced locations, a more accurate indication of the moisture conditions in a given area is obtained because both locations must be wet or moist before appreciable current will flow in the circuit. Another advantage is that by placing the sensing elements at different levels in the ground, the application of sufficient moisture at various root levels is assured.

A particular feature of the invention is the construction of the sensing elements and the connection of them in the detection circuit in a manner such that the inner electrodes are at the potential of the circuit, while the outer electrodes are at the same potential. This serves to insure against undesired flow of current through the soil along some relatively electrically conductive path before the soil is thoroughly wet.

In some instances it may be desirable to supply more water to certain areas than others. To accomplish this I may embody some means associated with each sensing unit, or set of units, for varying the electrical characteristics of the individual circuit. Referring to Fig. 9, which is a schematic view of the detector circuit means, I show a variable resistor 135a connected in series between the switch 36 and the detector units 18a, and a similar resistor 135b connected between the switch 36 and the units 18b. Thus, with this construction it is possible to vary the resistance of the individual circuits independently of the main circuit means 30.

While I have shown and described preferred forms of my invention, I contemplate that various changes and modifications can be made therein without departing from the scope of the invention as indicated by the claim. In this connection, it may be pointed out that although the invention has been particularly shown and described with reference to an irrigation system for the ground or soil, the invention is suitable for use in determining the moisture requirements of any porous substance which, when dry, is a relatively poor conductor of electricity.

I claim:

In means for sensing the presence of moisture in the ground and adapted to be operatively associated with a moisture supply means, a moisture sensing circuit coupled to a source of alternating current and including a pair of moisture sensing units connected in series therein, said units being buried in the ground at spaced regions and each comprising a pair of spaced electrodes, said pair of spaced electrodes comprising an outer electrode, an inner electrode housed within the outer electrode and soil between the electrodes, the inner electrodes of said units being connected to be at the potential of the circuit and the outer electrodes being connected together by a conductor.

References Cited in the file of this patent

UNITED STATES PATENTS

| | | |
|---|---|---|
| 2,047,638 | Kott | July 14, 1936 |
| 2,063,840 | Fairchild et al. | Dec. 8, 1936 |
| 2,228,223 | Bays | Jan. 7, 1941 |
| 2,349,992 | Schrader | May 30, 1944 |
| 2,393,009 | Chun | Jan. 15, 1946 |
| 2,422,873 | Wolfner | June 24, 1947 |
| 2,570,111 | Goble | Oct. 2, 1951 |
| 2,689,479 | Feigal | Sept. 21, 1954 |
| 2,793,526 | Dalglish | May 28, 1957 |
| 2,812,976 | Hasenkamp | Nov. 12, 1957 |

FOREIGN PATENTS

| | | |
|---|---|---|
| 331,410 | Germany | Jan. 7, 1921 |
| 666,927 | Germany | Oct. 31, 1938 |